E. W. SAYERS.
FOUR HORSE EVENER.
APPLICATION FILED JUNE 1, 1916.

1,216,734.   Patented Feb. 20, 1917.

Witness
Arthur K. Moore
L. N. Gillis

Inventor
E. W. Sayers
By
Attorneys

UNITED STATES PATENT OFFICE.

EDWARD W. SAYERS, OF BOGUE, KANSAS.

FOUR-HORSE EVENER.

1,216,734.  Specification of Letters Patent.  Patented Feb. 20, 1917.

Application filed June 1, 1916. Serial No. 101,100.

*To all whom it may concern:*

Be it known that I, EDWARD W. SAYERS, a citizen of the United States, residing at Bogue, in the county of Graham, State of Kansas, have invented certain new and useful Improvements in Four-Horse Eveners; and I do hereby declare the following to be a full, clear, and exact description of the invention, such as will enable others skilled in the art to which it appertains to make and use the same.

This invention relates to eveners for vehicles and has special reference to an improved evener for use in connection with four horse eveners.

In the ordinary type of four horse evener, it frequently happens that when one of the teams gets ahead of the other team the end of the doubletree on the side opposite the first team will strike the front wheel of the vehicle.

The principal object of the invention is to provide a device of this description wherein four horses may be hitched abreast and wherein the device will be so arranged and disposed that it will not contact with the front wheels no matter what position it may assume in the limits of its movement.

With the above and other objects in view, as will be hereinafter apparent the invention consists in general of certain novel details of construction and combinations of parts hereinafter fully described, illustrated in the accompanying drawing, and specifically claimed.

In the accompanying drawing, like characters of reference indicate like parts in the several views; and:—

In the embodiment of the invention herein illustrated there is provided an evener bar 10 which consists preferably of a length of tubular material such as a steel or iron tube and which may be of any desired diameter.

At each end of this bar 10 there is provided an end casting or member 11. Each of these end members is provided on the front face with an arcuate seat 12 wherein rests the outer part of the end of the bar 10, the terminal portion of the end of the bar 10 fitting in a socket 13 formed at the outer end of said end member. Furthermore, each of these end members has its inner end spaced rearwardly of the bar 10 as indicated at 14.

Figure 1:
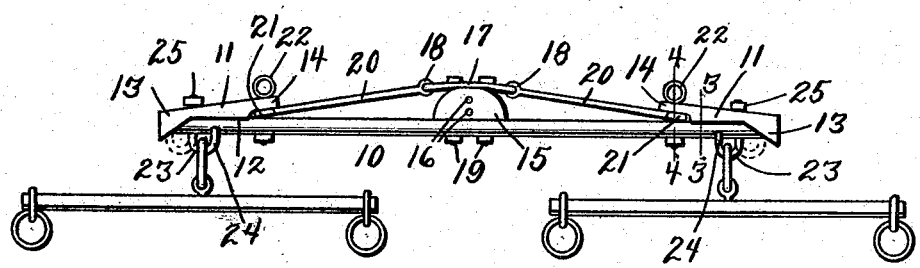
Figure 1 is a plan view of an evener bar constructed in accordance with this invention and adapted for use in a four horse evener.
Figure 2:
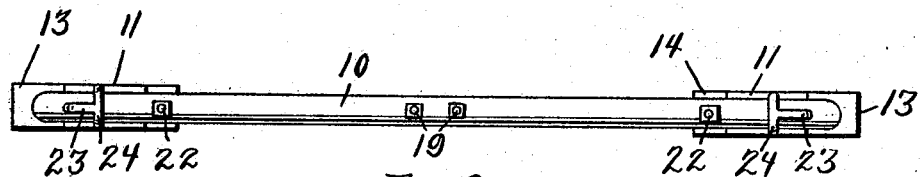
Fig. 2 is a front elevation thereof.
Figure 3:
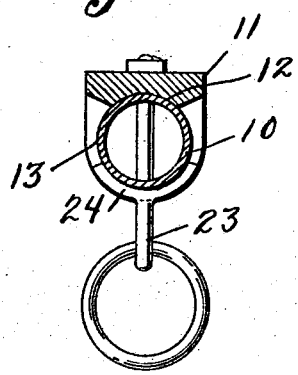
Fig. 3 is a section on the line 3—3 of Fig. 1.
Figure 4:
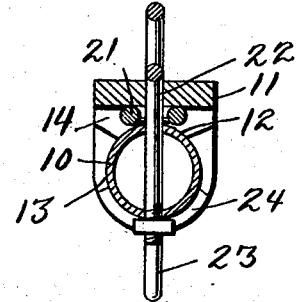
Fig. 4 is a section on the line 4—4 of Fig. 2.

Disposed centrally to the rear of the bar 10 is a strut 15 provided with a plurality of spaced openings 16 by means of which to permit attachment of the device to the tongue of a wagon, a bolt being passed through one of these openings 16 and through a suitable opening on said tongue. At the rear of the strut 15 is a truss strap 17 formed at each end with an eye 18. The strut, rod or bar 10 and strap 17 are secured together by means of bolts 19 which pass through the three members as clearly shown in Fig. 1. To each of the eyes 18 is secured one end of a truss rod 20, the other end of the rod being provided with an eye which rests between the portion 14 of the respective end member and the adjacent portion of the bar 10. These eyes are indicated at 21 and through each of these eyes and the adjacent portions of the end members and bar is passed an eye bolt 22 which secures these parts together.

Through the outer portions of the members 11 and bar 10 extends the shanks of the J-bolt 23. The extremities of these shanks extend rearwardly of the members 11 and on these extremities are the nuts 25 to hold the bolts in adjusted position. The extremity of each bill of the bolts 23 is forked as at 24 for the purpose of engaging over the bar 10 when either in the full line position shown in Fig. 1 or in the dotted line position shown in that figure. Thus the distance between the lines of pull on these J-bolts may be varied and the bolts shifted in accordance with the desired point of attachment of the doubletree, which is used for attaching each team.

There has thus been provided a simple and efficient device of the kind described and for the purpose specified.

It is obvious that many minor changes may be made in the form and construction of the invention without departing from the material principles thereof. It is not therefore desired to confine the invention to the exact form herein shown and described but it is wished to include all such as properly come within the scope claimed.

What is claimed is:—

In a device of the kind described, an evener bar, an end member on each end of the bar, each of said end members having a seat for said bar terminating in a socket fitting the respective terminal portion of the bar, a strut extending rearwardly of the center of the bar, a truss member having eyes at its ends located between the inner ends of the end members and the adjacent portions of the bar, the center of the truss being engaged on the strut, bolts passing through the end members, eyes and bar, J-bolts having their shank extending revolubly through the end members and bar and having their bills forked to engage over the bar, and nuts on said shanks to hold the J-bolts in adjusted position.

In testimony whereof, I affix my signature, in the presence of two witnesses.

EDWARD W. SAYERS.

Witnesses:
A. LEWIS,
Z. T. FLETCHER.

Copies of this patent may be obtained for five cents each, by addressing the "Commissioner of Patents, Washington, D. C."